April 30, 1963 J. J. SHATYNSKI 3,087,895
AUTOMATIC TRANSMISSION FLUIDS CONTAINING A TRIARYL PHOSPHATE
Filed May 14, 1959
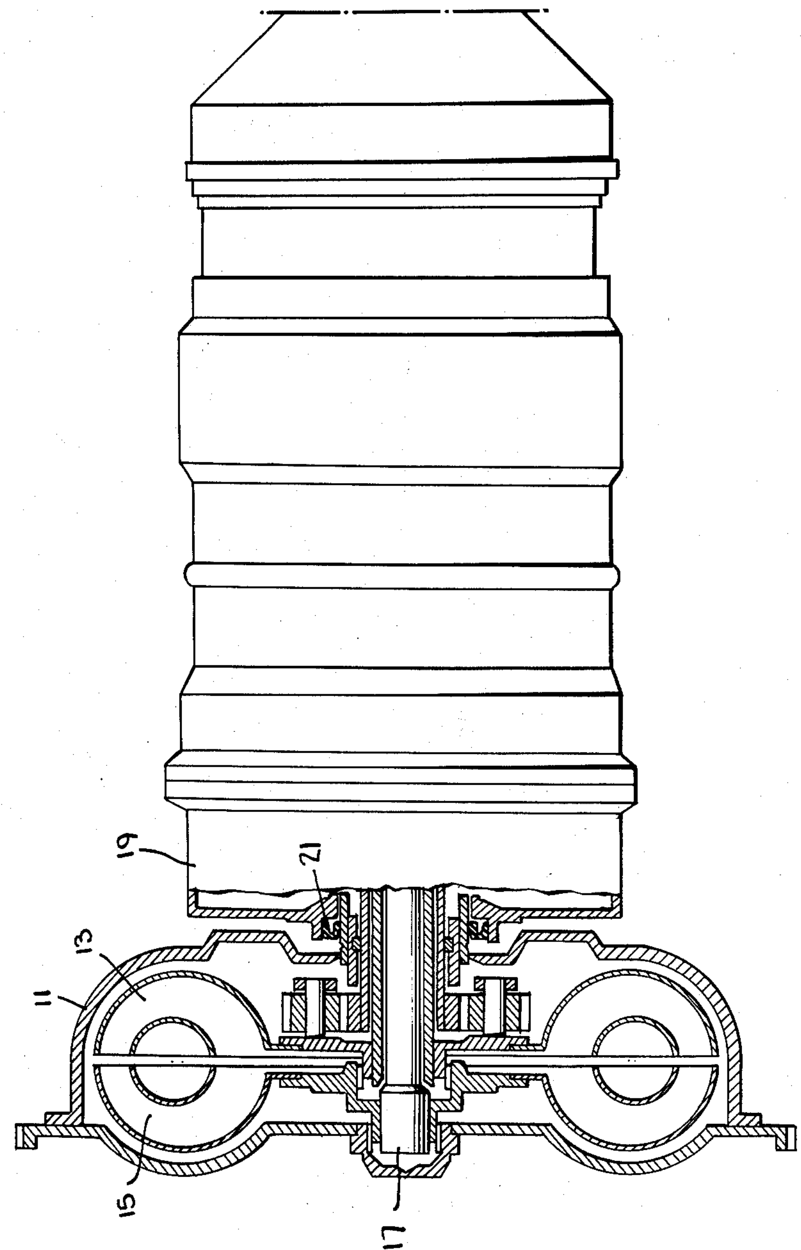

United States Patent Office 3,087,895

Patented Apr. 30, 1963

3,087,895

AUTOMATIC TRANSMISSION FLUIDS CONTAINING A TRIARYL PHOSPHATE

John J. Shatynski, Elizabeth, N.J., assignor to Celanese Corporation of America, New York, N.Y., a corporation of Delaware Filed May 14, 1959, Ser. No. 813,283
8 Claims. (Cl. 252—78)

This invention relates to hydraulic fluids and relates particularly to hydraulic fluids used in automatic transmissions.

The automatic transmissions of automobiles are commonly filled with petroleum-base fluids. An increasingly important problem in the use of such transmissions is the tendency for the fluid to leak past the rubber seals of the transmission, so that the motorist must check on the level of the fluid quite frequently and add fluid in order to prevent damage to the transmission mechanism.

It is one object of this invention to decrease the leakage of transmission fluid from automatic transmissions of motor vehicles.

Other objects of this invention will be apparent from the following detailed description and claims. In this description and claims all proportions are by weight unless otherwise indicated.

In accordance with one aspect of this invention, the leakage of transmission fluid is markedly diminished by the addition thereto, of a small proportion, e.g. about 1 to 10%, preferably about 1 to 3% of a triaryl phosphate. While I do not wish to be bound by any particular explanation of this phenomenon, I believe that the leakage is related to the high temperatures of operation of modern automatic transmissions. As the horsepower of new automobiles has increased, year by year, the transmission fluid temperatures have likewise increased, so that now temperatures in the neighborhood of 275 to 300° F. are not uncommon. I believe that at these temperatures the synthetic rubber seals become hardened or tend to shrink, and that the addition of the aryl phosphate swells or softens the seals so that they can again perform their function.

Examples of suitable triaryl phosphates are cresyl diphenyl phosphate; the phosphate ester of a cresylic acid containing about 8% phenol, about 40% m- and p-cresol, about 12% o-cresol, about 30% xylenols, and about 10% higher alkyl phenols containing 3–6 carbon atoms in alkyl side chains, such as propyl phenol, methyl ethyl phenol and butyl phenol, said phosphate ester having a viscosity of about 150 SUS at 100° F.; and the phosphate ester of a cresylic acid containing about 15% m- and p-cresols, about 75% xylenols and about 10% of the above-mentioned higher alkyl phenols, said phosphate ester having a viscosity of about 220 SUS at 100° F. Usually the phosphate ester will have a total of 18 to 30 carbon atoms in the aryl hydrocarbon radicals and will have a viscosity, in undiluted form, of about 90–1000 SUS at 100° F. It is preferable to use mixed phosphate esters containing a plurality of different aryl hydrocarbon radicals, which may be phenyl or alkyl phenyl radicals. Particularly good results are obtained with mixed phosphate esters whose viscosity is in the range of about 200 to 230 SUS at 100° F., using about 2% of the phosphate ester in the transmission fluid.

The triaryl phosphate may be added to the transmission fluid of any of the usual automatic transmissions, e.g. the "Turboglide" transmission of a 1958 Chevrolet passenger automobile, a 1956 R "Hydra-Matic" transmission, a "Powerglide" transmission or a "Mercomatic" transmission. In such transmissions the fluid is used to transmit power, in a fluid coupling which may be a torque converter, from rotating vanes driven by the crankshaft of the engine to a turbine which drives, through intermediate clutches, a planetary gear arrangement connected to the driveshaft of the automobile. The seals of such transmissions are generally of synthetic rubber, such as the rubbery copolymer of butadiene and acrylonitrile (Buna N); a representative Buna N seal, generally used for testing purposes in the industry, is made of Acadia 3612 rubber compound (Acadia Synthetic Products Division, Western Feltworks). Neoprene (vulcanized polychloroprene) seals are also employed. Leakage of transmission fluids most frequently takes place through the front main seal of the transmission, adjacent to the fluid coupling.

The transmission fluids commonly employed are paraffin base oils. One well known set of standards for these fluids is General Motors standards for Automatic Transmission Fluid Type A (as discussed, for example, in the SAE Journal for November 1956, pages 20–27). Fluids passing such tests generally have a viscosity at 210° F. of at least 49 SUS and a viscosity at 0° F. (as determined by extrapolation from viscosities determined at 100° F. and 210° F. using ASTM chart A) of at most 7000 seconds. If desired, the fluid may contain minor amounts of such additives as oxidation inhibitors (e.g. t-butyl cresol), detergents (e.g. barium petroleum sulfonates), oiliness agents (e.g. sperm oil) and viscosity index improvers (e.g. polymerized lauryl methacrylate).

The addition of the triaryl phosphate has proved to be highly effective. For example, in a transmission which leaked at the rate of one quart per week the leakage was substantially eliminated within two weeks after the addition of one half pint of a triaryl phosphate (the triaryl phosphate being the one identified above as having a viscosity of 220 SUS at 100° F.) to the 11 quarts of automatic transmission fluid present in the transmission. In addition, the triaryl phosphate has no adverse effect on the other desirable properties of the automatic transmission fluid. The triaryl phosphate need not be added solely to the fluids of cars having leaky transmissions but may be incorporated, as a leak preventative, in the fluid employed in a new transmission which has not yet begun to leak.

The drawing is a diagrammatic view of a conventional automatic transmission having a fluid-filled outer casing 11 which is attached to the usual engine crankshaft and flywheel and which rotates therewith. Located within the outer casing 11 is a fluid coupling comprising a vaned impeller 13 and a vaned turbine 15. The impeller 13 is connected to the casing 11 for rotation therewith and the turbine 15 is driven by the motion of the fluid in response to the rotation of the impeller. The turbine 15 is mounted on a shaft 17 which is connected to the drive shaft of the automobile through a series of clutches and planetary gears (not shown) contained in a housing 19. An annular front main seal 21 is disposed between the housing 19 and the rotatable casing 11 to seal against leakage of fluid from said casing.

It is to be understood that the foregoing detailed description is merely given by way of illustration and that many variations may be made therein without departing from the spirit of my invention.

Having described my invention, what I desire to secure by Letters Patent is:

1. A process for preventing leakage of a hydrocarbon liquid from a hydraulic system using such hydrocarbon liquid to transmit power and having rubbery sealing means which comprises adding to said liquid a sufficient amount of a triaryl phosphate to inhibit leakage.

2. A process for preventing leakage of a hydrocarbon liquid from an automatic transmission comprising a fluid coupling using such hydrocarbon liquid to transmit power and having rubbery sealing means which comprises adding to said liquid a sufficient amount of a triaryl phosphate to inhibit leakage.

3. A process for preventing leakage of a hydrocarbon liquid from a hydraulic system using such hydrocarbon liquid to transmit power and having rubbery butadiene-acrylonitrile copolymer sealing means which comprises adding to said liquid a sufficient amount of a triaryl phosphate containing 18 to 30 carbon atoms per phosphorus atom to inhibit leakage.

4. A process for preventing leakage of a hydrocarbon liquid from an automatic transmission comprising a fluid coupling using such hydrocarbon liquid to transmit power and having rubbery butadiene-acrylonitrile copolymer sealing means which comprises adding to said liquid a sufficient amount of triaryl phosphate containing 18 to 30 carbon atoms per phosphorus atom to inhibit leakage.

5. A process for preventing leakage of a hydrocarbon liquid from a hydraulic system using such hydrocarbon liquid to transmit power and having rubbery butadiene-acrylonitrile copolymer sealing means which comprises adding to said liquid a mixed triaryl phosphate containing 18 to 30 carbon atoms per phosphorus atom and having a viscosity at 100° F. of about 200 to 230 SUS, said phosphate being added in an amount sufficient to inhibit leakage.

6. A process for preventing leakage of a hydrocarbon liquid from an automatic transmission comprising a fluid coupling using such hydrocarbon liquid to transmit power and having rubbery butadiene-acrylonitrile copolymer sealing means which comprises adding to said liquid a mixed triaryl phosphate containing 18 to 30 carbon atoms per phosphorus atom and having a viscosity at 100° F. of about 200 to 230 SUS, said phosphate being added in an amount sufficient to inhibit leakage.

7. An automatic transmission for an engine-driven vehicle, comprising a fluid coupling, means to transmit power from said engine to said coupling, means to transmit power from said coupling to the drive shaft of said vehicle, and synthetic rubber seals for said transmission, said coupling containing as the fluid a mixture of a paraffinic base transmission fluid and about 1 to 10%, based on the weight of said fluid, of a triaryl phosphate.

8. An automatic transmission for an engine-driven vehicle, comprising a fluid coupling, means to transmit power from said engine to said coupling, means to transmit power from said coupling to the drive shaft of said vehicle, and butadiene-acryonitrile copolymer rubber seals for said transmission, said coupling containing as the fluid a mixture of a paraffinic base transmission fluid and about 1 to 3%, based on the weight of said fluid, of a mixed triaryl phosphate of 18 to 30 carbon atoms per phosphorus atom, said phosphate having a viscosity of about 200 to 230 SUS at 100° F.

References Cited in the file of this patent

UNITED STATES PATENTS

| | | |
|---|---|---|
| 2,659,699 | George | Nov. 17, 1953 |
| 2,934,501 | Moreton | Apr. 26, 1960 |
| 2,961,408 | Havely et al. | Nov. 22, 1960 |
| 2,965,574 | Tierney et al. | Dec. 20, 1960 |